US012005718B2

(12) United States Patent
Nakajima et al.

(10) Patent No.: US 12,005,718 B2
(45) Date of Patent: Jun. 11, 2024

(54) PRINTING APPARATUS

(71) Applicant: SEIKO EPSON CORPORATION, Tokyo (JP)

(72) Inventors: Yoshinori Nakajima, Matsumoto (JP); Yuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 18/049,317

(22) Filed: Oct. 25, 2022

(65) Prior Publication Data

US 2023/0137739 A1 May 4, 2023

(30) Foreign Application Priority Data

Oct. 28, 2021 (JP) ................................ 2021-176207

(51) Int. Cl.
*B41J 2/21* (2006.01)

(52) U.S. Cl.
CPC .................................. *B41J 2/2103* (2013.01)

(58) Field of Classification Search
CPC ...................................................... B41J 2/2103
See application file for complete search history.

(56) References Cited

U.S. PATENT DOCUMENTS

2021/0094221 A1* 4/2021 Smith ...................... B41J 2/145

FOREIGN PATENT DOCUMENTS

JP 2016-215438 A 12/2016

* cited by examiner

*Primary Examiner* — Justin Seo
(74) *Attorney, Agent, or Firm* — WORKMAN NYDEGGER

(57) ABSTRACT

A printing apparatus includes a head and a robot which changes a position of the head with respect to a workpiece, the head includes a first nozzle row for ejecting a first ink and a second nozzle row for ejecting a second ink which has lower brightness than the first ink, the robot includes an arm portion having a distal end, a proximal end, and a base portion coupled to the proximal end, and supports the head by the distal end, and a first joint which is a joint closest to the distal end and rotate around a first rotating axis, and a distance between the second nozzle row and the first rotating axis is less than a distance between the first nozzle row and the first rotating axis when viewed in a direction along the first rotating axis.

13 Claims, 10 Drawing Sheets

PRINTING APPARATUS

The present application is based on, and claims priority from JP Application Serial Number 2021-176207, filed Oct. 28, 2021, the disclosure of which is hereby incorporated by reference herein in its entirety.

BACKGROUND

1. Technical Field

The present disclosure relates to a printing apparatus.

2. Related Art

An ink jet type printing apparatus using a robot such as an articulated robot is known. For example, the apparatus described in JP-A-2016-215438 includes a head that is an ink jet head and a robot that holds the head.

When performing printing using a plurality of colors of ink, the head is generally provided with a plurality of nozzle rows for each color of the ink. JP-A-2016-215438 does not describe the arrangement of a plurality of nozzle rows when ejecting a plurality of colors of ink. In a printing apparatus in which a head is moved by using a robot, when performing printing using a plurality of colors of ink, it is desired to realize an appropriate arrangement of a plurality of nozzle rows so that good print quality can be obtained.

SUMMARY

According to an aspect of the present disclosure, there is provided a printing apparatus including: a head including a first nozzle row in which a plurality of nozzles for ejecting a first ink are arranged and a second nozzle row in which a plurality of nozzles for ejecting a second ink are arranged; and a robot which includes an arm portion having a distal end, a proximal end, and a plurality of joints, and a base portion coupled to the proximal end, supports the head by the distal end, and changes a position and a posture of the head with respect to a workpiece, in which a brightness of the second ink is lower than a brightness of the first ink, the plurality of joints have a first joint which is a joint closest to the distal end among the plurality of joints, the first joint is a rotating mechanism around a first rotating axis, and a distance between the second nozzle row and the first rotating axis is less than a distance between the first nozzle row and the first rotating axis when viewed in a direction along the first rotating axis.

DESCRIPTION OF EXEMPLARY EMBODIMENTS

Figure 1:
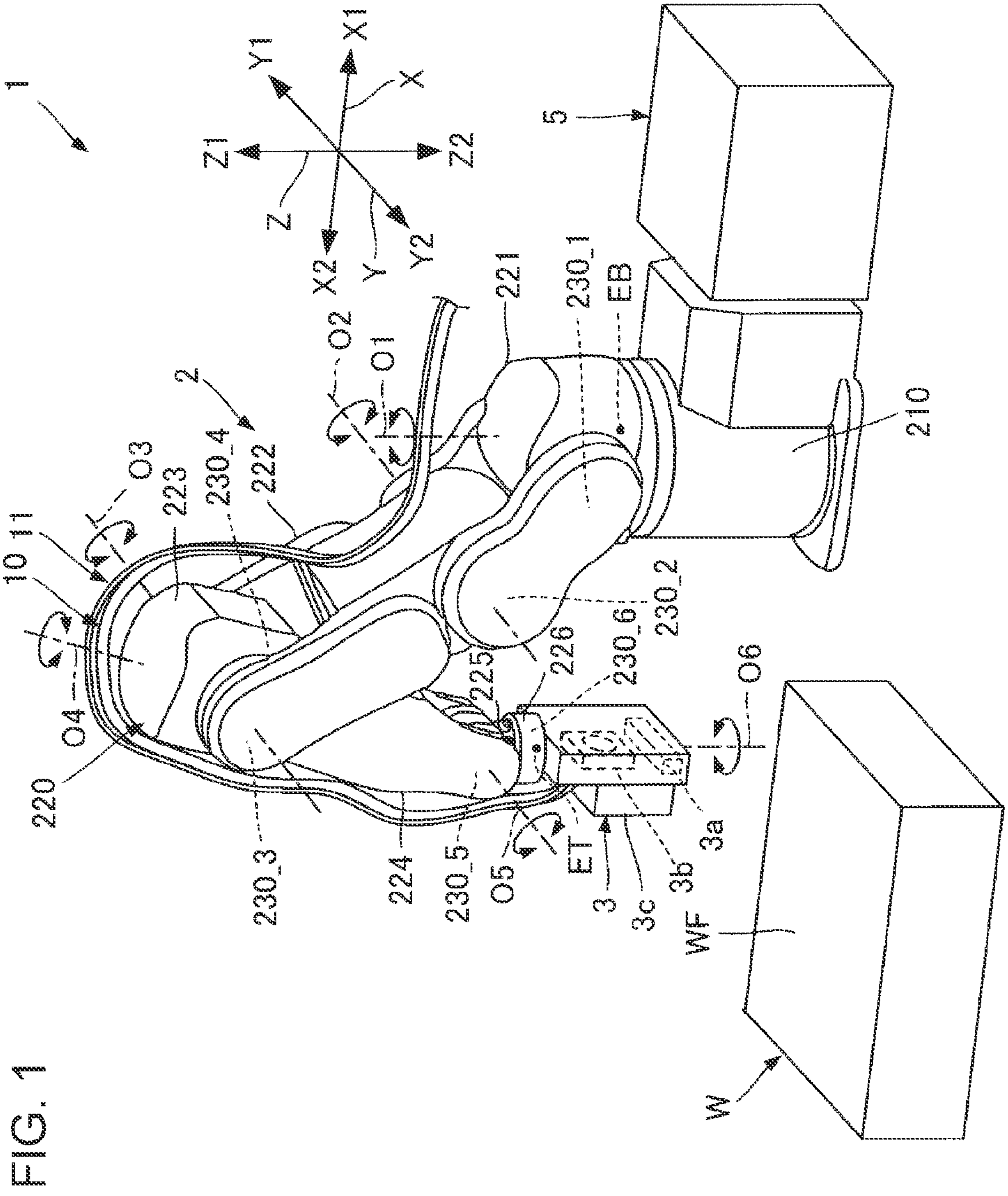
FIG. 1 is a perspective view illustrating an overview of a printing apparatus according to a first embodiment.

Hereinafter, preferred embodiments according to the present disclosure will be described with reference to the attached drawings. In the drawings, the dimensions and scale of each section may differ from the actual ones, and some parts are schematically illustrated for ease of understanding. Further, the scope of the present disclosure is not limited to these aspects unless otherwise stated to limit the disclosure in the following description.

In the following description, for convenience, an X axis, a Y axis, and a Z axis that intersect each other are appropriately used. In addition, in the following, one direction along the X axis is an X1 direction, and the direction opposite to the X1 direction is an X2 direction. Similarly, the directions opposite to each other along the Y axis are a Y1 direction and a Y2 direction. In addition, the directions opposite to each other along the Z axis are a Z1 direction and a Z2 direction.

Here, the X axis, the Y axis, and the Z axis correspond to the coordinate axes of the world coordinate system set in the space where a robot 2 described later is installed. Typically, the Z axis is a vertical axis, and the Z2 direction corresponds to a downward direction in the vertical direction. A base coordinate system based on the position of a base portion 210 described later of the robot 2 is associated with the world coordinate system by calibration. In the following, for convenience, a case where the operation of the robot 2 is controlled by using the world coordinate system as the robot coordinate system is exemplified.

The Z axis does not have to be a vertical axis. Further, the X axis, the Y axis, and the Z axis are typically orthogonal to each other, but the present disclosure is not limited thereto, and the X axis, the Y axis, and the Z axis may not be orthogonal to each other. For example, the X axis, Y axis, and Z axis may intersect each other at an angle within the range of 80° or more and 100° or less.

1. First Embodiment

1-1. Overview of Printing Apparatus

FIG. 1 is a perspective view illustrating an overview of a printing apparatus 1 according to a first embodiment. A printing apparatus 1 is an apparatus that performs printing on the surface of a workpiece W by an ink jet method.

The workpiece W has a surface WF to be printed. In the example illustrated in FIG. 1, the workpiece W is a rectangular parallelepiped and the surface WF is a plane. The workpiece W at the time of printing is supported by a structure such as a predetermined installation table, a robot hand, or a conveyor, if necessary. The shape or size of the workpiece W or the surface WF is not limited to the example illustrated in FIG. 1, and is any shape or size. For example, the surface WF may have a curved or bent part, or the workpiece W may be a sheet material such as paper or cloth. Further, the position or posture of the workpiece W or the surface WF at the time of printing may be any position or posture as long as printing can be performed, and is not limited to the example illustrated in FIG. 1.

As illustrated in FIG. 1, the printing apparatus 1 includes a robot 2, a head unit 3, a controller 5, a piping section 10, and a wiring section 11. Hereinafter, first, these will be briefly described in order.

The robot 2 is a robot that changes the position and posture of the head unit 3 in the world coordinate system. In the example illustrated in FIG. 1, the robot 2 is a so-called 6-axis vertical articulated robot.

As illustrated in FIG. 1, the robot 2 has a base portion 210 and an arm portion 220.

The base portion 210 is a platform that supports the arm portion 220. In the example illustrated in FIG. 1, the base portion 210 is fixed to a floor surface facing the Z1 direction or an installation surface such as a base by screwing or the like. The installation surface to which the base portion 210 is fixed may be a surface facing in any direction, and is not limited to the example illustrated in FIG. 1, and may be, for example, a surface having a wall, a ceiling, a movable cart, or the like.

The arm portion 220 is a 6-axis robot arm having a proximal end EB attached to the base portion 210 and a distal end ET that changes the position and posture three-dimensionally with respect to the proximal end EB. Specifically, the arm portion 220 has arms 221, 222, 223, 224, 225 and 226, also referred to as links. These are coupled in the order of arms 221, 222, 223, 224, 225 and 226.

The arm 221 is rotatably coupled to the base portion 210 around a rotating axis O1 via a joint 230_1. The arm 222 is rotatably coupled to the arm 221 around a rotating axis O2 via a joint 230_2. The arm 223 is rotatably coupled to the arm 222 around a rotating axis O3 via a joint 230_3. The arm 224 is rotatably coupled to the arm 223 around a rotating axis O4 via a joint 230_4. The arm 225 is rotatably coupled to the arm 224 around a rotating axis O5 via a joint 230_5. The arm 226 is rotatably coupled to the arm 225 around a rotating axis O6 via a joint 230_6. Further, the joint 230_6 is an example of the "first joint", and the rotating axis O6 is an example of the "first rotating axis". The joint 230_5 is an example of the "second joint", and the rotating axis O5 is an example of the "second rotating axis".

Each of the joints 230_1 to 230_6 is a mechanism for rotatably coupling one of two adjacent members of the base portion 210 and the arms 221 to 226 to the other. In the following, each of the joints 230_1 to 230_6 may be referred to as "joint 230". Here, the proximal end EB is one end of the arm portion 220 of which the position in the base coordinate system does not change even when the joint 230 turns, and the distal end ET is the other end of the arm portion 220 of which the position in the base coordinate system changes due to rotation of the joint 230_6. The proximal end EB can be defined, for example, as an intersection between the boundary between the base portion 210 and the arm 221 and the rotating axis O1. Further, the distal end ET can be defined as, for example, the intersection between the end surface of the arm 226, which is most distant from the arm 225, or the surface that extends the end surface, and the rotating axis O6.

Although not illustrated in FIG. 1, each of the joints 230_1 to 230_6 is provided with a driving mechanism for rotating one of the two corresponding members with respect to the other. The driving mechanism includes, for example, a motor that generates a driving force for rotation, a speed reducer that decelerates and outputs the driving force, and an encoder such as rotary encoder that detects an operating amount such as an angle of rotation. The aggregate of the driving mechanisms of the joints 230_1 to 230_6 corresponds to an arm driving mechanism 2*a* illustrated in FIG. 2 described later. Further, the motor corresponds to the motors 2*a*1 to 2*a*6 illustrated in FIG. 2.

The rotating axis O1 is an axis perpendicular to the installation surface (not illustrated) to which the base portion 210 is fixed. The rotating axis O2 is an axis perpendicular to the rotating axis O1. The rotating axis O3 is an axis parallel to the rotating axis O2. The rotating axis O4 is an axis perpendicular to the rotating axis O3. The rotating axis O5 is an axis perpendicular to the rotating axis O4. The rotating axis O6 is an axis perpendicular to the rotating axis O5.

Regarding these rotating axis, "vertical" includes not only the case where the angle formed by the two rotating axis is exactly 90°, and but also the case where the angle formed by the two rotating axis is shifted within a range of approximately 90°±5°. Similarly, "parallel" includes not only the case where the two rotating axis are strictly parallel, but also the case where one of the two rotating axis is tilted within a range of approximately ±5° with respect to the other.

The head unit 3 is mounted at the distal end ET of the arm portion 220 of the robot 2 as an end effector in a state of being fixed by screwing or the like.

The head unit 3 is an assembly having a head 3*a* that ejects a plurality of types of ink having different brightness toward the workpiece W. In the present embodiment, the head unit 3 has not only the head 3*a* but also a pressure adjusting valve 3*b* and an energy emitting section 3*c*. The details of the head unit 3 will be described with reference to FIG. 3 described later.

In the present embodiment, a case where four types of inks such as a first ink, a second ink, a third ink, and a fourth ink having different brightness are used is exemplified. The brightness of these inks are in the order of the first ink, the third ink, the fourth ink, and the second ink from the highest to the lowest. When performing full-color printing, the four types of ink are typically yellow ink, magenta ink, cyan ink, and black ink. In this case, the first ink is yellow ink, the second ink is black ink, one of the third ink and the fourth ink is magenta ink, and the other one of the third ink and the fourth ink is cyan ink. Here, the brightness can be defined by, for example, the brightness of the CIE L*a*b* color space defined by the International Commission on Illumination (CIE). In the present embodiment, the brightness of the CIE L*a*b* color space is 83 for yellow ink, 54 for magenta ink, 56 for cyan ink, and 11 for black ink. The value of the brightness of the ink is obtained by, for example, applying the ink on a medium such as printing paper to create a predetermined color patch, and then by measuring the color patch with a color measuring machine. Here, the brightness of a plurality of types of inks is compared by creating a color patch using the same amount of ink on the same medium for each of the plurality of types of inks, and by comparing the values obtained by measuring the color patch of the plurality of types of inks.

Each such ink is, for example, a liquid medium in which a coloring material such as a dye or a pigment is dissolved or dispersed in a solvent. Each ink may be any one of ink such as a water-based ink in which a coloring material such as a dye or a pigment is dissolved in an aqueous solvent; a curable ink using a curable resin such as an ultraviolet curable type; and a solvent-based ink obtained by dissolving a coloring material such as a dye or a pigment in an organic solvent, but a curable ink is preferably used. The curable ink is not particularly limited, and for example, any of a thermosetting type, a photocurable type, a radiation curable type, an electron beam curable type, and the like, but a photocurable type such as an ultraviolet curable type is preferable. Further, the ink containing the coloring material is not limited to yellow ink, magenta ink, cyan ink, and black ink, and may be, for example, white ink, gray ink, light cyan ink, light magenta ink and the like.

Each of the piping section 10 and the wiring section 11 is coupled to the head unit 3. The piping section 10 is a group of piping that supplies ink from an ink tank (not illustrated) to the head unit 3. The wiring section 11 is a wiring or a wiring group for supplying an electric signal for driving the head 3*a*.

The controller 5 is a robot controller that controls the drive of the robot 2. Hereinafter, the electric configuration of the printing apparatus 1 will be described with reference to FIG. 2, including a detailed description of the controller 5.

1-2. Electric Configuration of Printing Apparatus

Figure 2:
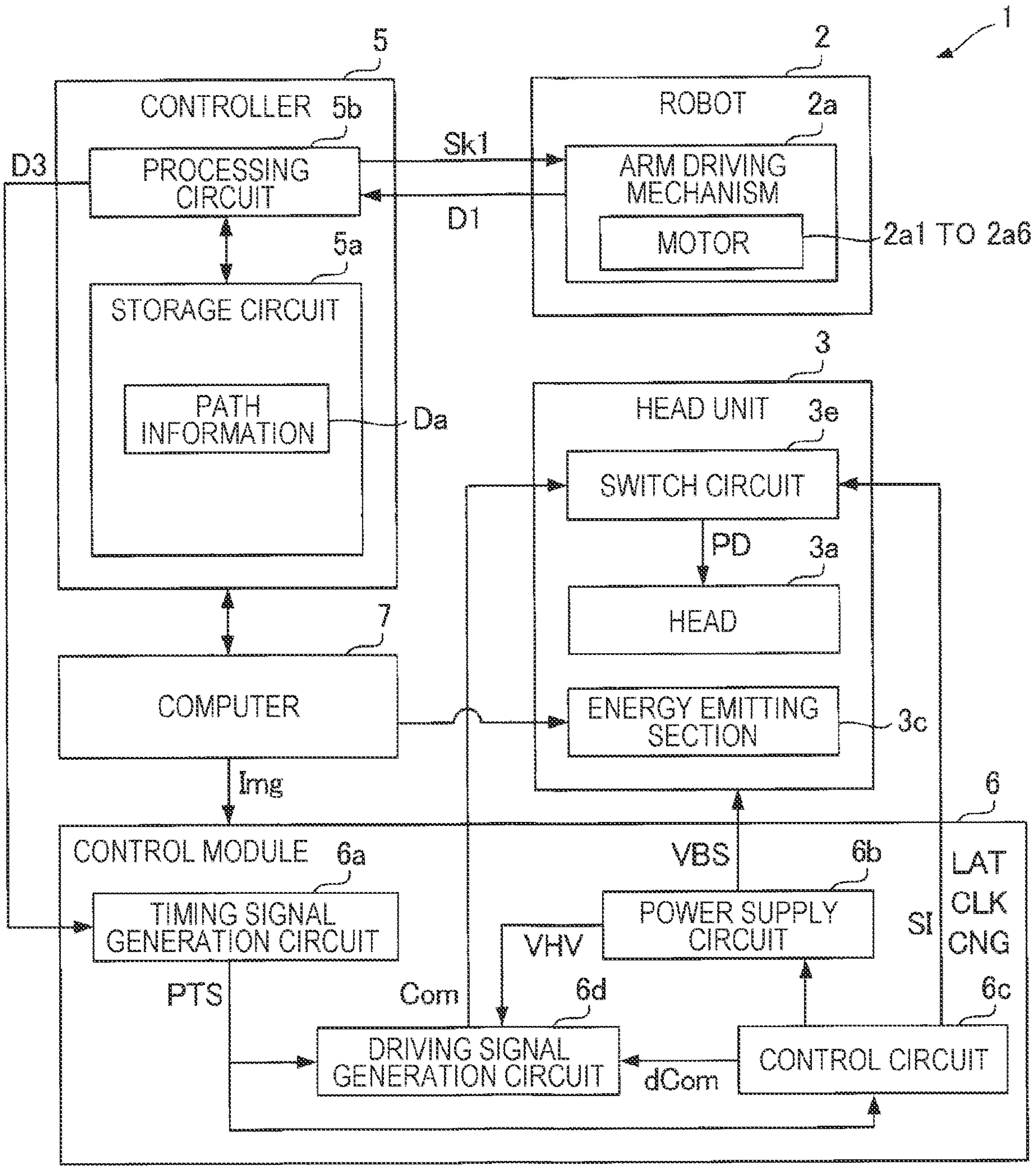
FIG. 2 is a block diagram illustrating an electric configuration of the printing apparatus according to the first embodiment.

FIG. 2 is a block diagram illustrating an electric configuration of the printing apparatus 1 according to the first embodiment. In FIG. 2, among the components of the printing apparatus 1, the electric components are illustrated. As illustrated in FIG. 2, the printing apparatus 1 includes not only the components illustrated in FIG. 1 described above, but also a control module 6 connected to the controller 5 to be capable of communicating therewith, and a computer 7 connected to the controller 5 and the control module 6 to be capable of communicating therewith.

Noted that each of the electric components illustrated in FIG. 2 may be appropriately divided, and a part thereof may be included in another component or may be integrally configured with the other component. For example, a part or the entirety of the functions of the controller 5 or the control module 6 may be realized by the computer 7, or may be realized by another external apparatus such as a personal computer (PC) connected to the controller 5 via a network such as a local area network (LAN) or the Internet.

The controller 5 has a function of controlling the drive of the robot 2 and a function of generating a signal D3 for synchronizing the ink ejection operation of the head unit 3 with the operation of the robot 2.

The controller 5 has a storage circuit 5*a* and a processing circuit 5*b*.

The storage circuit 5*a* stores various programs executed by the processing circuit 5*b* and various data processed by the processing circuit 5*b*. The storage circuit 5*a* includes one or both semiconductor memories, for example, a volatile memory such as a random access memory (RAM); and a non-volatile memory such as a read only memory (ROM), an electrically erasable programmable read-only memory (EEPROM), or a programmable ROM (PROM). A part or the entirety of the storage circuit 5*a* may be included in the processing circuit 5*b*.

Path information Da is stored in the storage circuit 5*a*. The path information Da is information indicating the path through which the head unit 3 moves and the posture of the head unit 3 in the path. The path information Da is generated by using, for example, information acquired by direct teaching, offline teaching, or the like, and information such as computer-aided design (CAD) data indicating the shape of the workpiece W. The path information Da is represented by using, for example, the coordinate values of the base coordinate system or the world coordinate system. The above path information Da is input from the computer 7 into the storage circuit 5*a*. The processing circuit 5*b* controls the operation of the arm driving mechanism 2*a* of the robot 2 based on the path information Da, and also generates the signal D3. The processing circuit 5*b* is, for example, a processor, such as one or more central processing units (CPU). The processing circuit 5*b* may include a programmable logic device such as a field-programmable gate array (FPGA) instead of the CPU or in addition to CPU.

Here, the arm driving mechanism 2*a* is an aggregate of the driving mechanisms of the joints 230_1 to 230_6 described above, and for each joint 230, the motors 2*a*1 to 2*a*6 for driving the joint 230 and an encoder (not illustrated) for detecting the rotation angle of the joint 230 are provided. Further, the motor 2*a*1 is a motor for driving the joint 230_1. The motor 2*a*2 is a motor for driving the joint 230_2. The motor 2*a*3 is a motor for driving the joint 230_3. The motor 2*a*4 is a motor for driving the joint 230_4. The motor 2*a*5 is a motor for driving the joint 230_5. The motor 2*a*6 is a motor for driving the joint 230_6.

The processing circuit 5*b* performs inverse kinematics calculation, which is an arithmetic operation for converting the path information Da into an operating amount such as a rotation angle and a rotation speed of each joint 230 of the robot 2. Then, the processing circuit 5*b* outputs a control signal Sk1 based on an output D1 from each encoder of the arm driving mechanism 2*a* so that the operating amount such as the actual rotation angle and the rotation speed of each joint 230 becomes the above-described arithmetic operation result based on the path information Da. The control signal Sk1 is a signal for controlling the drive of the motor of the arm driving mechanism 2*a*. Here, the control signal Sk1 is corrected by the processing circuit 5*b* based on the output from the distance sensor (not illustrated), if necessary. The distance sensor is installed in the head unit 3, for example, and outputs a signal according to the distance from the workpiece W.

Further, the processing circuit 5*b* generates the signal D3 based on the output D1 from at least one of the plurality of encoders of the arm driving mechanism 2*a*. For example, the processing circuit 5*b* generates, as a signal D3, a trigger signal including a pulse at a timing at which the output D1 from one of the plurality of encoders becomes a predetermined value.

The control module 6 is a circuit that controls the ink ejection operation in the head unit 3 based on the signal D3 output from the controller 5 and print data Img from the computer 7. The control module 6 includes a timing signal generation circuit 6*a*, a power supply circuit 6*b*, a control circuit 6*c*, and a driving signal generation circuit 6*d*.

The timing signal generation circuit 6*a* generates a timing signal PTS based on the signal D3. The timing signal generation circuit 6*a* is composed of, for example, a timer that starts generation of the timing signal PTS when the signal D3 is detected. The timing signal PTS includes, for example, a pulse defined based on the output D1.

The power supply circuit 6*b* receives power from a commercial power source (not illustrated) and generates various predetermined potentials. The various generated potentials are appropriately supplied to each section of the control module 6 and the head unit 3. For example, the power supply circuit 6*b* generates a power supply potential VHV and an offset potential VBS. The offset potential VBS is supplied to the head unit 3. Further, the power supply potential VHV is supplied to the driving signal generation circuit 6*d*.

The control circuit 6*c* generates a print data signal SI, a waveform designation signal dCom, a latch signal LAT, a clock signal CLK, and a change signal CNG based on the timing signal PTS. These signals are synchronized with the timing signal PTS. Of these signals, the waveform designation signal dCom is input into the driving signal generation circuit 6*d*, and the other signals are input into a switch circuit 3*e* of the head unit 3. The print data signal SI is a digital signal for designating the operating state of the driving element included in the head 3*a* of the head unit 3. Specifically, the print data signal SI designates whether to supply a driving signal Com, which will be described later, to the driving element based on the print data. By this designation, it is designated, for example, whether to eject ink from the nozzle corresponding to the driving element, or the amount of ink ejected from the nozzle is designated. The waveform designation signal dCom is a digital signal for defining the waveform of the driving signal Com. The latch signal LAT and the change signal CNG are used in combination with the print data signal SI, and by defining the drive timing of the driving element, the ink ejection timing from the nozzle is defined. The clock signal CLK is a reference clock signal synchronized with the timing signal PTS.

The above control circuit 6*c* includes, for example, one or more processors such as a CPU. The control circuit 6*c* may include a programmable logic device such as an FPGA instead of the CPU or in addition to the CPU.

The driving signal generation circuit 6*d* is a circuit that generates the driving signal Com for driving each driving element included in the head 3*a* of the head unit 3. Specifically, the driving signal generation circuit 6*d* has, for example, a DA converter circuit and an amplifier circuit. In the driving signal generation circuit 6*d*, the DA converter circuit converts the waveform designation signal dCom from the control circuit 6*c* from a digital signal into an analog signal, and the amplifier circuit generates the driving signal Com by amplifying the analog signal using the power supply potential VHV from the power supply circuit 6*b*. Here, among the waveforms included in the driving signal Com, the signal of the waveform actually supplied to the driving element is a driving pulse PD. The driving pulse PD is supplied to the driving element from the driving signal generation circuit 6*d* via the switch circuit 3*e* of the head unit 3.

Here, the switch circuit 3*e* is a circuit including a switching element that switches whether to supply at least a part of the waveform included in the driving signal Com as the driving pulse PD based on the print data signal SI.

The computer 7 has a function of supplying information such as the path information Da to the controller 5 and a function of supplying information such as the print data Img to the control module 6. In addition to these functions, the computer 7 of the present embodiment has a function of controlling the drive of the energy emitting section 3*c*. The computer 7 is, for example, a desktop computer or a notebook computer in which a program that realizes these functions is installed.

1-3. Configuration of Head Unit

Figure 3:
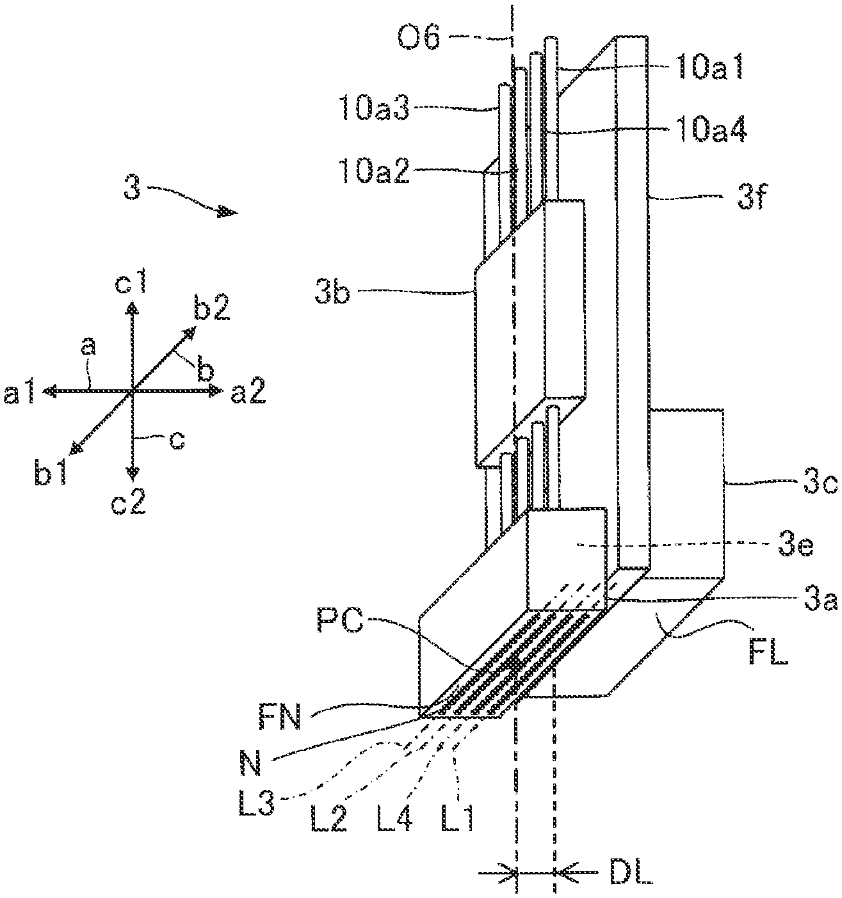
FIG. 3 is a perspective view illustrating a schematic configuration of a head unit used in the first embodiment.

FIG. 3 is a perspective view illustrating a schematic configuration of the head unit 3 used in the first embodiment. In the following description, for convenience, an a axis, a b axis, and a c axis that intersect each other are appropriately used. In addition, in the following, one direction along the a axis is an a1 direction, and the direction opposite to the a1 direction is an a2 direction. Similarly, the directions opposite to each other along the b axis are a b1 direction and a b2 direction. In addition, the directions opposite to each other along the c axis are a c1 direction and a c2 direction.

Here, the a axis, the b axis, and the c axis correspond to the coordinate axes of the tool coordinate system set in the head unit 3, and the relationship between the position and posture relative to the above-described world coordinate system or robot coordinate system changes by the operation of the above-described robot 2. In the example illustrated in FIG. 3, the c axis is an axis parallel to the above-described rotating axis O6. In addition, the a axis, the b axis, and the c axis are typically orthogonal to each other, but are not limited thereto, and may intersect each other at an angle within the range of 80° or more and 100° or less, for example. The tool coordinate system and the base coordinate system or the robot coordinate system are associated with each other by calibration. Further, the tool coordinate system is set so that, for example, the center of an ejection surface FN described later becomes a reference (TCP: tool center point).

As described above, the head unit 3 has the head 3*a*, the pressure adjusting valve 3*b*, and the energy emitting section 3*c*. These are supported by a support 3*f* illustrated by the alternate long and short dash line in FIG. 3. In the example illustrated in FIG. 3, the number of each of the head 3*a* and the pressure adjusting valve 3*b* included in the head unit 3 is one, but the number is not limited to the example illustrated in FIG. 3, and may be two or more. Further, the installation position of the pressure adjusting valve 3*b* is not limited to the head unit 3, and may be, for example, the arm 226 or the like, or may be a fixed position with respect to the base portion 210.

The support 3*f* is made of, for example, a metal material or the like, and is a substantially rigid body. In the example illustrated in FIG. 3, the support 3*f* has a flat plate shape extending in a direction orthogonal to the a axis. In the present embodiment, the head 3*a* is attached to the surface of the support 3*f* facing the a1 direction. On the other hand, the energy emitting section 3*c* is attached to the surface of the support 3*f* facing the a2 direction. The shape of the support 3*f* is not limited to the example illustrated in FIG. 3, and may be any shape, for example, a box shape or the like.

The above support 3*f* is mounted on the above-described arm 226. Therefore, the head 3*a*, the pressure adjusting valve 3*b*, and the energy emitting section 3*c* are collectively supported on the arm 226 by the support 3*f*. Therefore, the relative positions of each of the head 3*a*, the pressure adjusting valve 3*b*, and the energy emitting section 3*c* with respect to the arm 226 are fixed. In the example illustrated in FIG. 3, the pressure adjusting valve 3*b* is arranged at the position in the c1 direction with respect to the head 3*a*. The energy emitting section 3*c* is arranged at a position in the a2 direction with respect to the head 3*a*.

The head 3*a* has the ejection surface FN and a plurality of nozzles N that open to the ejection surface FN. The ejection surface FN is a nozzle surface through which the nozzle N opens, and is composed of, for example, a surface of a nozzle plate in which the nozzle N is provided as a through-hole in a plate-shaped member made of a material such as silicon (Si) or metal.

In the example illustrated in FIG. 3, the normal direction of the ejection surface FN is the c2 direction. Here, the rotating axis O6 intersects the ejection surface FN. In the drawing, a center PC of the ejection surface FN and the rotating axis O6 coincide with each other when viewed in the direction along the rotating axis O6. In addition, the center PC of the ejection surface FN and the rotating axis O6 may be shifted from each other when viewed in the direction along the rotating axis O6.

The plurality of nozzles N provided on the ejection surface FN are classified into a first nozzle row L1, a second nozzle row L2, a third nozzle row L3, and a fourth nozzle row L4. These nozzle rows are arranged in the order of the first nozzle row L1, the fourth nozzle row L4, the second nozzle row L2, and the third nozzle row L3 in the a1 direction at intervals.

Each of the first nozzle row L1, the second nozzle row L2, the third nozzle row L3, and the fourth nozzle row L4 is a set of a plurality of nozzles N linearly arranged in the direction along the b axis. In the present embodiment, the nozzle density in the direction along the b axis of each nozzle N included in each nozzle row is 300 npi (number of nozzles/inch). However, the present disclosure is not limited thereto, and a lower nozzle density may be used, but a nozzle density of 25 npi or more is preferable from the viewpoint of print quality and efficiency. Further, in order to realize such a nozzle density, the nozzles N may be arranged in a staggered manner in each nozzle row. Here, the first nozzle row L1, the second nozzle row L2, the third nozzle row L3, and the fourth nozzle row L4 eject different types of ink from each other. Specifically, the first nozzle row L1 ejects the first ink. The second nozzle row L2 ejects the second ink. The third nozzle row L3 ejects the third ink. The fourth nozzle row L4 ejects the fourth ink. Since all the inks are ejected in the c2 direction under ideal conditions, the c2 direction can also be expressed as the ejection direction. Further, the arrangement of the first nozzle row L1, the second nozzle row L2, the third nozzle row L3, and the fourth nozzle row L4 will be described in detail later with reference to FIGS. 5 and 6.

Although not illustrated, the head 3*a* has a piezoelectric element which is a driving element and a cavity for accommodating ink for each nozzle N. Here, the piezoelectric element ejects ink from the nozzle corresponding to the cavity by changing the pressure of the cavity corresponding to the piezoelectric element. The head 3*a* can be obtained, for example, by adhering a plurality of substrates such as a silicon substrate appropriately processed by etching or the like with an adhesive or the like. As the driving element for ejecting ink from the nozzle, a heater for heating the ink in the cavity may be used instead of the piezoelectric element.

Ink is supplied to the head 3*a* from an ink tank (not illustrated) via a first supply pipe 10*a*1, a second supply pipe 10*a*2, a third supply pipe 10*a*3, and a fourth supply pipe 10*a*4. Here, the pressure adjusting valve 3*b* is interposed between each of the first supply pipe 10*a*1, the second supply pipe 10*a*2, the third supply pipe 10*a*3, and the fourth supply pipe 10*a*4 and the head 3*a*. The first supply pipe 10*a*1 is a flexible pipe for supplying the first ink to the head 3*a*. The second supply pipe 10*a*2 is a flexible pipe that supplies the second ink to the head 3*a*. The third supply pipe 10*a*3 is a flexible pipe that supplies the third ink to the head 3*a*. The fourth supply pipe 10*a*4 is a flexible pipe that supplies the fourth ink to the head 3*a*.

In the example illustrated in FIG. 3, the downstream ends of the first supply pipe 10*a*1, the second supply pipe 10*a*2, the third supply pipe 10*a*3, and the fourth supply pipe 10*a*4 are directed toward the a1 direction, and the first supply pipe 10*a*1, the fourth supply pipe 10*a*4, the second supply pipe 10*a*2, and the third supply pipe 10*a*3 are arranged in this order. Here, the distance between the downstream end of the second supply pipe 10*a*2 or the fourth supply pipe 10*a*4 and the rotating axis O6 may be less than the distance between the downstream end of the first supply pipe 10*a*1 or the third supply pipe 10*a*3 and the rotating axis O6.

The pressure adjusting valve 3*b* is a valve mechanism that is opened and closed according to the pressure of the ink in the head 3*a*. By this opening and closing, the pressure of the ink in the head 3*a* is maintained at a negative pressure within a predetermined range even when the positional relationship between the head 3*a* and the ink tank (not illustrated above) changes. Therefore, the meniscus of the ink formed on the nozzle N of the head 3*a* is stabilized. As a result, it is possible to prevent air bubbles from entering the nozzle N and ink from overflowing from the nozzle N. Further, the ink from the pressure adjusting valve 3*b* is appropriately distributed to a plurality of locations of the head 3*a* via a branch flow path (not illustrated). Here, the ink from the ink tank (not illustrated) is transferred in the first supply pipe 10*a*1, the second supply pipe 10*a*2, the third supply pipe 10*a*3, and the fourth supply pipe 10*a*4 at a predetermined pressure by using a pump, a water head difference, or the like. Although not illustrated, the pressure adjusting valve 3*b* has a configuration for ink flow path and pressure adjustment for each type of ink so that the pressure of each of the above-described four types of ink can be adjusted individually.

The energy emitting section 3*c* emits energy such as light, heat, electron beam, or radiation for curing or solidifying the ink on the workpiece W. For example, when the ink has ultraviolet curability, the energy emitting section 3*c* is composed of a light emitting element such as a light emitting diode (LED) that emits ultraviolet rays. Further, the energy emitting section 3*c* may appropriately have an optical component such as a lens for adjusting the energy emitting direction or the energy emitting range.

Here, the energy emitting section 3*c* includes an emitting surface FL that emits the energy, and is arranged so that the emitting surface FL faces the c2 direction. Further, as described above, since the rotating axis O6 intersects the ejection surface FN, the distance between each nozzle row and the rotating axis O6 is less than the distance between the emitting surface FL and the rotating axis O6.

The energy emitting section 3*c* does not have to completely cure or completely solidify the ink on the workpiece W. In this case, for example, the ink after the energy irradiation from the energy emitting section 3*c* may be completely cured or completely solidified by the energy from the curing light source separately installed on the installation surface of the base portion 210 of the robot 2.

1-3. Printing Operation of Printing Apparatus

Figure 4:
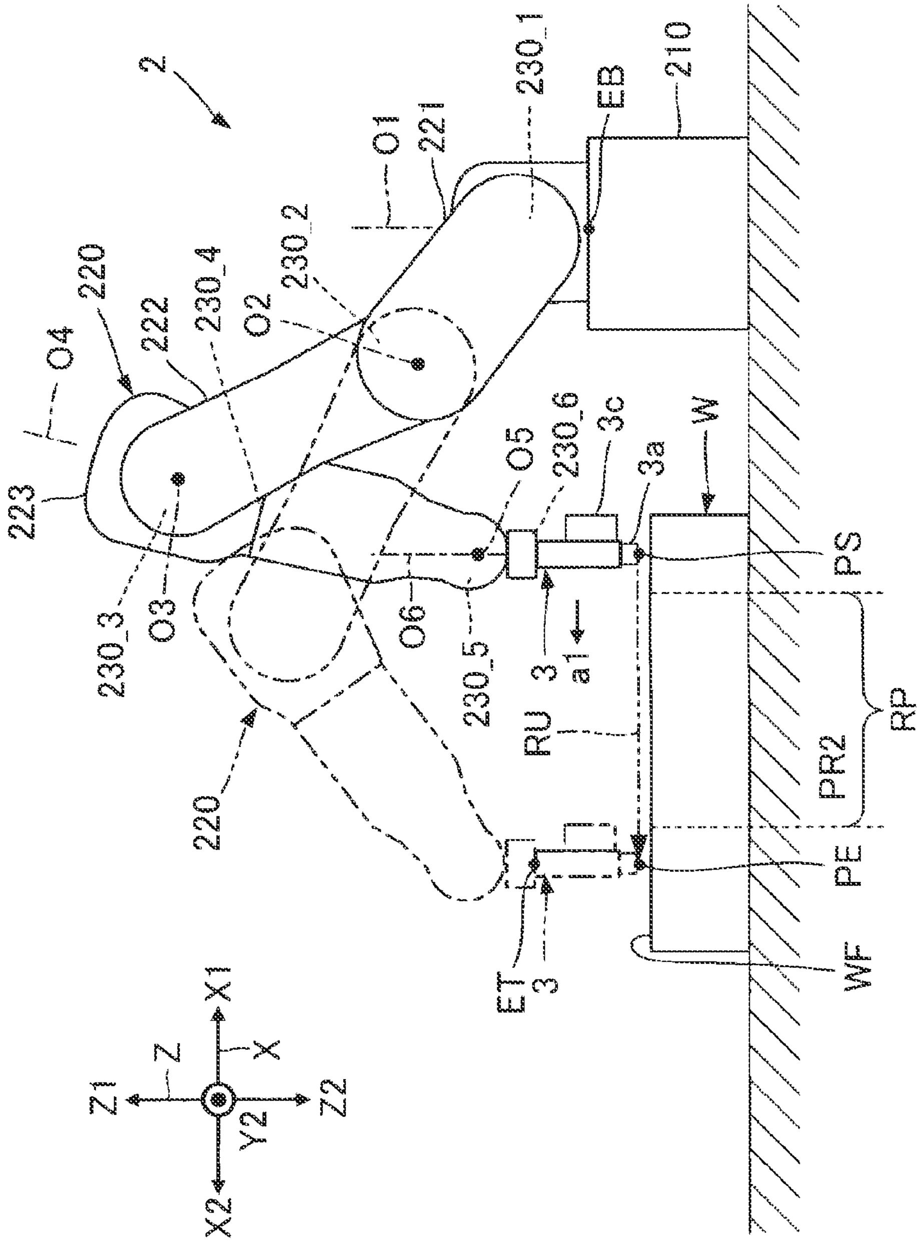
FIG. 4 is a view for describing a printing operation of the printing apparatus according to the first embodiment.

FIG. 4 is a view for describing a printing operation of the printing apparatus 1 according to the first embodiment. FIG. 4 illustrates a case where printing is performed on a predetermined region RP of the surface WF of the workpiece W placed at a position in the X2 direction from the base portion 210 of the robot 2 when viewed in the direction along the Y axis. The workpiece W may be arranged at a position shifted from the base portion 210 of the robot 2 in the Y1 direction or the Y2 direction when viewed in the direction along the X axis. When the robot 2 is suspended from the ceiling, the workpiece W and the base portion 210 may be arranged at overlapping positions when viewed in the direction along the Z axis.

In the printing operation, the head 3*a* ejects ink while the robot 2 changes the position and posture of the head 3*a*. The change in the position and posture of the head 3*a* is performed based on the path information Da. As a result, the head 3*a* moves along a moving path RU while maintaining a predetermined posture with respect to the surface WF. The head 3*a* may be moved a plurality of times along the moving path RU for each ink ejection of each color, or all the inks may be ejected in parallel during one movement of the head 3*a* along the moving path RU.

The moving path RU is a path from a position PS to a position PE. The position PS is a position in the X1 direction with respect to the predetermined region RP when viewed in the Z2 direction. The position PE is a position in the X2 direction with respect to the predetermined region RP when viewed in the Z2 direction. In the period until the head 3*a* reaches the predetermined region RP from the position PS, the head 3*a* accelerates until the predetermined speed is reached. In the period during which the head 3*a* is positioned in the predetermined region RP, the head 3*a* moves at a constant speed at the predetermined speed. In the period during which the head 3*a* reaches the position PE from the predetermined region RP, the head 3*a* is decelerated so as to be able to stop at the position PE. Here, the predetermined region RP is a region extending from a position PR1 to a position PR2 along the moving path RU.

In the example illustrated in FIG. 4, the moving path RU has a linear shape when viewed in the Z2 direction. The robot 2 moves the head 3*a* linearly along the moving path RU by operating three or more joints 230 including the joints 230_2, 230_3, and 230_5 among the six joints 230 while the printing operation is being executed. Further, the robot 2 moves the head 3*a* in a direction away from the base portion 210. Here, the above-described a1 direction faces forward in the moving direction of the head 3*a*. Therefore, the energy emitting section 3*c* is positioned behind the head 3*a* in the moving direction of the head 3*a*. Therefore, the ink immediately after landing on the surface WF from the head 3*a* can be irradiated with the energy from the energy emitting section 3*c*.

Here, when the workpiece W is arranged at a position overlapping the base portion 210 when viewed in the direction along the X axis, the moving path RU forms a straight line along the X axis when viewed in the Z2 direction. Further, in this case, the robot 2 performs the printing operation by operating three joints 230 among the six joints 230 while the printing operation is being executed. More specifically, the robot 2 keeps the rotating axis of the joint 230_2, the joint 230_3, and the joint 230_5 parallel to the Y axis while the printing operation is being executed, and operates the joints 230. By such an operation of the three joints 230, the head 3*a* can be stably moved along the moving path RU. In this case, it is not necessary to operate the joint 230_6. On the other hand, the workpiece W is arranged at a position shifted in the Y1 direction or the Y2 direction with respect to the base portion 210 when viewed in the direction along the X axis, and the moving path RU forms a straight line along the X axis when viewed in the Z2 direction. In this case, in order to maintain the posture of the head 3*a* in the moving direction, it is necessary to operate the joint 230_6 with the movement of the head 3*a* along the moving path RU, so that the effect described later by the arrangement of the nozzle rows becomes remarkable.

The robot 2 may move the head 3*a* from the position PE to the position PS in the direction approaching the base portion 210 along the moving path RU. In this case, printing is performed in a state where the posture of the head unit 3 is rotated by 180° around the rotating axis O6 from the state illustrated in FIG. 4 so that the a1 direction faces the front in the moving direction of the head 3*a*.

Further, since the above-described a1 direction faces the front in the moving direction of the head 3*a* while the printing operation is being executed, the above-described first nozzle row L1, the fourth nozzle row L4, the second nozzle row L2, and the third nozzle row L3 are arranged in this order from the near side to the far side with respect to the base portion 210.

1-4. Arrangement of Nozzle Row

Figure 5:
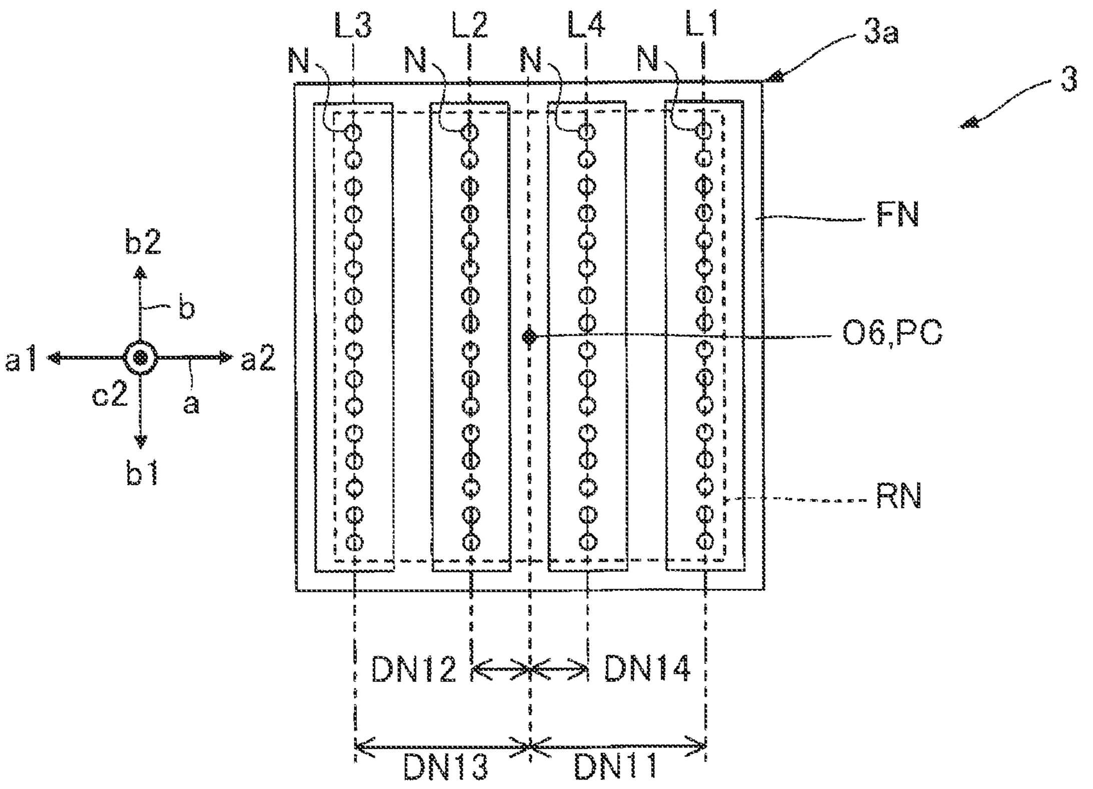
FIG. 5 is a schematic plan view for describing arrangement of a plurality of nozzle rows in the first embodiment.

FIG. 5 is a schematic plan view for describing the arrangement as a plurality of nozzle rows in the first embodiment. FIG. 5 shows a diagram in which the first nozzle row L1, the second nozzle row L2, the third nozzle row L3, and the fourth nozzle row L4 are viewed in the c1 direction as the plurality of nozzle rows. As described above, these are arranged in the order of the first nozzle row L1, the fourth nozzle row L4, the second nozzle row L2, and the third nozzle row L3 in the a1 direction. In the example illustrated in FIG. 5, these nozzle rows are arranged at equal intervals. The intervals between these nozzle rows do not have to be equal. Further, the lengths of these nozzle rows may be different from each other.

Here, when viewed in the direction along the rotating axis O6, the rotating axis O6 is positioned inside the region RN defined by a set of the first nozzle row L1, the second nozzle row L2, the third nozzle row L3, and the fourth nozzle row L4. The region RN can be represented as a quadrangle having the smallest area surrounding all the nozzles N provided on the ejection surface FN. In the example illustrated in FIG. 5, since the lengths of these nozzle rows are equal to each other and both ends of these nozzle rows are aligned, the shape of the region RN is rectangular. The shape of the region RN may be a rectangle and is not limited to the rectangle. For example, when each nozzle row extends in the same direction tilted with respect to the b axis, the shape of the region RN is a parallelogram. Further, both ends of these nozzle rows do not have to be aligned. That is, at least one of these nozzle rows may be arranged so as to be shifted in the extending direction of the nozzle rows.

In the example illustrated in FIG. 5, the rotating axis O6 is positioned between the second nozzle row L2 and the fourth nozzle row L4 when viewed in the direction along the rotating axis O6. The position of the rotating axis O6 when viewed in the direction along the rotating axis O6 is not limited to the example illustrated in FIG. 5, and may be, for example, a position overlapping the second nozzle row L2 or the fourth nozzle row L4. However, of the first nozzle row L1, the second nozzle row L2, the third nozzle row L3, and the fourth nozzle row L4, the second nozzle row L2 is preferably the nozzle row closest to the center PC of the ejection surface FN or the rotating axis O6.

As can be understood from the above, a distance DN12 between the second nozzle row L2 and the rotating axis O6 is less than a distance DN11 between the first nozzle row L1 and the rotating axis O6, and less than a distance DN13 between the third nozzle row L3 and the rotating axis O6, when viewed in the direction along the rotating axis O6.

Similarly, a distance DN14 between the fourth nozzle row L4 and the rotating axis O6 is less than the distance DN11 between the first nozzle row L1 and the rotating axis O6, and less than the distance DN13 between the third nozzle row L3 and the rotating axis O6.

In the example illustrated in FIG. 5, the distance DN11 is equal to the distance DN13 and the distance DN12 is equal to the distance DN14. The distance DN11 may be different from the distance DN13. Further, the distance DN12 may be different from the distance DN14.

Figure 6:
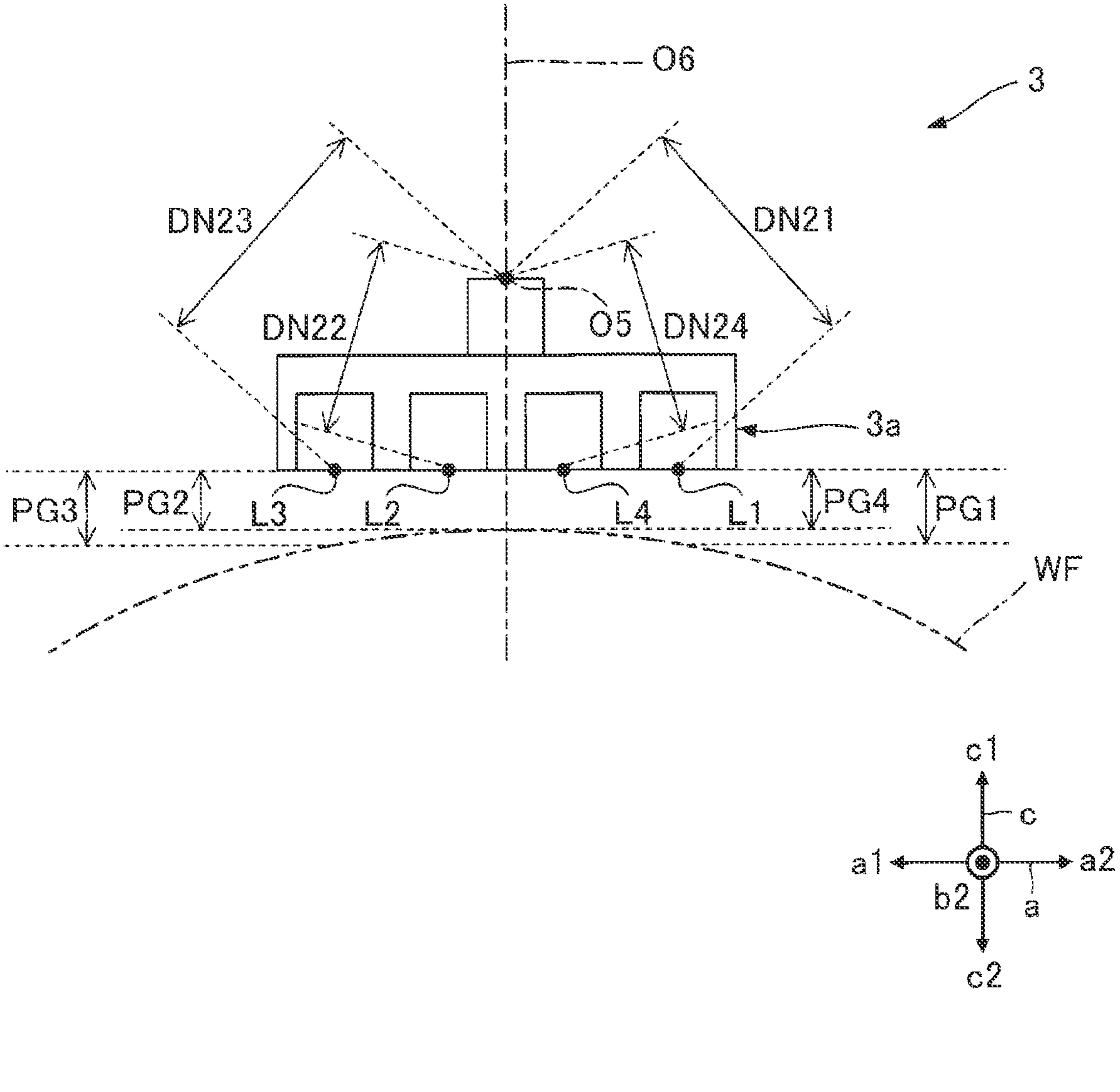
FIG. 6 is a schematic side view for describing arrangement of the plurality of nozzle rows in the first embodiment.

FIG. 6 is a schematic side view for describing the arrangement of the plurality of nozzle rows in the first embodiment. FIG. 6 shows a diagram in which the first nozzle row L1, the second nozzle row L2, the third nozzle row L3, and the fourth nozzle row L4 are viewed in the b1 direction as the plurality of nozzle rows.

Here, as illustrated in FIG. 6, the rotating axis O5 is orthogonal to the rotating axis O6, and a distance DN22 between the second nozzle row L2 and the rotating axis O5 is less than a distance DN21 between the first nozzle row L1 and the rotating axis O5, and less than a distance DN23 between the third nozzle row L3 and the rotating axis O5, when viewed in the direction along the rotating axis O5.

Similarly, a distance DN24 between the fourth nozzle row L4 and the rotating axis O5 is less than the distance DN21 between the first nozzle row L1 and the rotating axis O5, and less than the distance DN23 between the third nozzle row L3 and the rotating axis O5, when viewed in the direction along the rotating axis O5.

In the example illustrated in FIG. 6, the distance DN21 is equal to the distance DN23 and the distance DN22 is equal to the distance DN24. The distance DN21 may be different from the distance DN23. Further, the distance DN22 may be different from the distance DN24.

1-5. Summary of First Embodiment

As described above, the printing apparatus 1 includes the head 3*a* and the robot 2 that changes the position and posture of the head 3*a* with respect to the workpiece W. Here, the head 3*a* includes the first nozzle row L1 in which the plurality of nozzles N for ejecting the first ink are arranged, and the second nozzle row L2 in which the plurality of nozzles N for ejecting the second ink are arranged. The robot 2 has the arm portion 220 having the distal end ET, the proximal end EB, and the plurality of joints 230, and the base portion 210 coupled to the proximal end EB, and the head 3*a* is supported by the distal end ET. The brightness of the second ink is lower than the brightness of the first ink. The plurality of joints 230 include the joint 230_6, which is an example of the "first joint". The joint 230_6 is the joint 230 closest to the distal end ET among the plurality of joints 230. Further, the joint 230_6 is a rotating mechanism around the rotating axis O6, which is an example of the "first rotating axis".

In addition, the distance DN12 between the second nozzle row L2 and the rotating axis O6 is less than the distance DN11 between the first nozzle row L1 and the rotating axis O6 when viewed in the direction along the rotating axis O6.

In the above printing apparatus 1, since the brightness of the second ink is lower than the brightness of the first ink, the landing error of the second ink on the workpiece W tends to be more conspicuous than the landing error of the first ink on the workpiece W. That is, the second ink is more likely to cause a deterioration in print quality due to the landing error on the workpiece W compared to the first ink. Here, in order to improve the print quality, the distance DN12 between the second nozzle row L2 and the rotating axis O6 is less than the distance DN11 between the first nozzle row L1 and the rotating axis O6 when viewed in the direction along the rotating axis O6.

More specifically, the joint 230_6 may be likely to causes vibration of the arm portion 220 as compared with other joints 230 due to insufficient holding force due to the small rated output of the motor, backlash of the speed reducer, and the like. Here, as the distance from the rotating axis O6 of the nozzle N increases, the ink landing error due to this vibration increases. This is because, as the distance from the rotating axis O6 of the nozzle N increases, the moment around the rotating axis O6 increases. Therefore, by making the distance DN12 less than the distance DN11, the influence of the moment on the second nozzle row L2 can be suppressed as compared with the first nozzle row L1, and as a result, the vibration of the second nozzle row L2 accompanying the vibration of the joint 230_6 can be made less than the vibration of the first nozzle row L1. Therefore, the landing error of the second ink on the workpiece W can be reduced.

As described above, the motors 2*a*1 to 2*a*6 for driving the joints 230 are provided in each of the plurality of joints 230. Here, the rated output of the motor 2*a*6 for driving the joints 230_6 is less than the rated output of the motors 2*a*1 to 2*a*5 for driving each of the joints 230_1 to 230_5 excluding the joint 230_6 among the plurality of joints 230.

On the other hand, the vibration of the first nozzle row L1 accompanying the vibration of the joint 230_6 is greater than the vibration of the second nozzle row L2, but in the first nozzle row L1, the first ink having less conspicuous landing error than that of the second ink is used.

As described above, of the first ink and the second ink having different brightness, by increasing the landing accuracy of the second ink in which the landing error is conspicuous compared to the landing accuracy of the first ink in which the landing error is inconspicuous, as a whole, it is possible to reduce the deterioration of the print quality due to the landing error of the ink on the workpiece W. Therefore, the print quality can be improved as compared with the configuration in which the distance DN12 is equal to or greater than the distance DN11.

In the present embodiment, as described above, the head 3*a* further includes the third nozzle row L3 in which the plurality of nozzles N for ejecting the third ink are arranged. The brightness of the third ink is lower than the brightness of the first ink and higher than the brightness of the second ink. In addition, the distance DN12 between the second nozzle row L2 and the rotating axis O6 is less than the distance DN13 between the third nozzle row L3 and the rotating axis O6 when viewed in the direction along the rotating axis O6. Moreover, the second nozzle row L2 is positioned between the first nozzle row L1 and the third nozzle row L3 when viewed in the direction along the rotating axis O6. Therefore, even when the third ink is used in addition to the first ink and the second ink, it is possible to reduce the deterioration of the print quality due to the landing error of the ink on the workpiece W.

Further, in the present embodiment, as described above, the head 3*a* further includes the fourth nozzle row L4 in which the plurality of nozzles N for ejecting the fourth ink are arranged. The brightness of the fourth ink is higher than the brightness of the second ink and lower than the brightness of the third ink. Moreover, the distance DN14 between the fourth nozzle row L4 and the rotating axis O6 is less than the distance DN11 between the first nozzle row L1 and the rotating axis O6, and less than the distance DN13 between the third nozzle row L3 and the rotating axis O6, when viewed in the direction along the rotating axis O6. Moreover, the fourth nozzle row L4 is positioned between the first nozzle row L1 and the third nozzle row L3 when viewed in the direction along the rotating axis O6. Therefore, even when the fourth ink is used in addition to the first ink, the second ink, and the third ink, it is possible to reduce the deterioration of the print quality due to the landing error of the ink on the workpiece W.

Further, as described above, the plurality of joints 230 include the joint 230_5, which is an example of the "second joint". The joint 230_5 is the joint 230 closest to the distal end ET next to the joint 230_6 among the plurality of joints 230. Further, the joint 230_5 is a rotating mechanism around the rotating axis O5, which is an example of the "second rotating axis". The rotating axis O5 is an axis that intersects the rotating axis O6. In addition, the distance DN22 between the second nozzle row L2 and the rotating axis O5 is less than the distance DN21 between the first nozzle row L1 and the rotating axis O5 when viewed in the direction along the rotating axis O5.

The joint 230_5 is likely to cause vibration of the arm portion 220 next to the joint 230_6. Here, as the distance from the rotating axis O5 of the nozzle N increases, the ink landing error due to this vibration increases. This is because, as the distance from the rotating axis O5 of the nozzle N increases, the moment around the rotating axis O5 increases. Therefore, by making the distance DN22 less than the distance DN21, the influence of the moment on the second nozzle row L2 can be suppressed as compared with the first nozzle row L1, and as a result, the vibration of the second nozzle row L2 accompanying the vibration of the joint 230_5 can be made less than the vibration of the first nozzle row L1. Therefore, the landing error of the second ink on the workpiece W can be reduced.

On the other hand, the vibration of the first nozzle row L1 accompanying the vibration of the joint 230_5 is greater than the vibration of the second nozzle row L2, but in the first nozzle row L1, the first ink having less conspicuous landing error than that of the second ink is used. As a result, it is possible to reduce the deterioration of the print quality due to the landing error of the ink on the workpiece W as a whole. In addition, the condition that the distance DN22 between the second nozzle row L2 and the rotating axis O5 is less than the distance DN21 between the first nozzle row L1 and the rotating axis O5 when viewed in the direction along the rotating axis O5 may satisfied while the printing operation is being executed, and it is not necessarily have to be satisfied in the period during which the liquid is not ejected to the workpiece W. For example, the distance between the rotating axis O5 and each nozzle row may change due to the turning of a joint such as the joint 230_6, which is closer to the distal end ET than the joint 230_5.

As described above, the printing apparatus 1 further includes the flexible first supply pipe 10*a*1 for supplying the first ink to the first nozzle row L1 and the flexible second supply pipe 10*a*2 for supplying the second ink to the second nozzle row L2. A part of each of the first supply pipe 10*a*1 and the second supply pipe 10*a*2 is held by the arm portion 220. In addition, the distance between the downstream end of the second supply pipe 10*a*2 and the rotating axis O6 is preferably less than the distance between the downstream end of the first supply pipe 10*a*1 and the rotating axis O6. When the deformation of the second supply pipe 10*a*2 becomes large due to the operation of the robot 2, there is a concern that the flow path resistance in the second supply pipe 10*a*2 fluctuates, which may cause a second ink ejection failure. Therefore, by making the distance between the downstream end of the second supply pipe 10*a*2 and the rotating axis O6 less than the distance between the downstream end of the first supply pipe 10*a*1 and the rotating axis O6, the amount of deformation of the second supply pipe 10*a*2 due to the operation of the joint 230_6 can be made less than the amount of deformation of the first supply pipe 10*a*1. As a result, it is possible to prevent ejection failure of the second ink.

Further, as described above, the printing apparatus 1 further includes the energy emitting section 3*c*. The energy emitting section 3*c* includes the emitting surface FL that is supported by the distal end ET and emits energy that cures each of the first ink and the second ink. Here, the head 3*a* includes the first nozzle row L1, the second nozzle row L2, the third nozzle row L3, and the fourth nozzle row L4 as a plurality of nozzle rows for ejecting ink. Moreover, when viewed in the direction along the rotating axis O6, the distances DN11, DN12, DN13, and DN14 between each of the plurality of nozzle rows and the rotating axis O6 are less than the distance DL between the emitting surface FL and the rotating axis O6. Therefore, the landing accuracy of ink on the workpiece W can be improved as compared with the configuration in which the distances DN11, DN12, DN13, and DN14 are equal to or greater than the distance DL. Here, since the accuracy of the energy irradiation position from the emitting surface FL to the workpiece W may not have to be higher than the landing accuracy, there is no problem even when the distance DL is greater than the distances DN11, DN12, DN13, and DN14.

Here, as described above, the rotating axis O6 is positioned inside the region RN defined by the set of the plurality of nozzle rows when viewed in the direction along the rotating axis O6. Therefore, the influence of the moment around the rotating axis O6 can be reduced as compared with the configuration in which the rotating axis O6 is positioned outside the region RN, and as a result, the landing accuracy of ink on the workpiece W can be improved.

More specifically, as described above, the head 3*a* includes the ejection surface FN provided with the first nozzle row L1, the second nozzle row L2, the third nozzle row L3, and the fourth nozzle row L4 as four nozzle rows for ejecting ink. In addition, the second nozzle row L2 is the nozzle row closest to the center PC of the ejection surface FN among the four nozzle rows. Therefore, in the configuration in which the rotating axis O6 is close to the center PC, the landing accuracy of the second ink on the workpiece W can be improved as compared with the configuration in which the other nozzle rows are closest to the center PC. In addition, the second nozzle row L2 may be the nozzle row closest to the center of the region RN among the four nozzle rows. When the surface WF of the workpiece W is a convex curved surface, as illustrated in FIG. 6, the distance between each second nozzle row L2 and the surface WF can be reduced while the distance PG2 between each nozzle row and the surface WF can be reduced to be less than the distance PG1 between the first nozzle row L1 and the surface WF. Therefore, in this case as well, the landing accuracy of the second ink on the workpiece W can be improved. It should be noted that these effects are not limited to the configuration of the present embodiment. For example, even when the position of the head 3*a* in the base coordinate system with respect to the position of the base portion 210 of the robot 2 is fixed and the robot 2 holds the workpiece W at the distal end of the arm portion 220 and moves the workpiece W, a similar effect can be obtained. That is, in a configuration in which the relative positions and postures of the workpiece W having the surface WF of the convex curved surface and the head 3*a* are changed while the printing operation is being executed, when the second nozzle row L2 is the nozzle row closest to the center PC of the ejection surface FN among the other nozzle rows, the landing accuracy of the second ink, of which the landing error tends to be more conspicuous than that of the first ink, can be improved, and the deterioration of the print quality can be suppressed as a whole.

In the present embodiment, as described above, the second ink is the ink having the lowest brightness among the inks ejected from the head 3*a*. Therefore, the print quality can be preferably improved.

Further, as described above, the second ink is black ink. Generally, among the plurality of colors of ink used for full-color printing and the like, the ink having the lowest brightness is black ink. Therefore, by using the black ink as the second ink, the print quality such as full-color printing can be preferably improved.

In the present embodiment, as described above, the first ink is the ink having the highest brightness among the inks ejected from the head 3*a*. Therefore, the print quality can be preferably improved.

Further, as described above, the first ink is yellow ink. Generally, among the plurality of colors of ink used for full-color printing and the like, the ink having the highest brightness is yellow ink. Therefore, by using the yellow ink as the first ink, the print quality such as full-color printing can be preferably improved. In a configuration using five or more types of ink, white ink may be used as the ink having the highest brightness. In this case, the first ink may be white ink.

2. Second Embodiment

Hereinafter, a second embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 7:
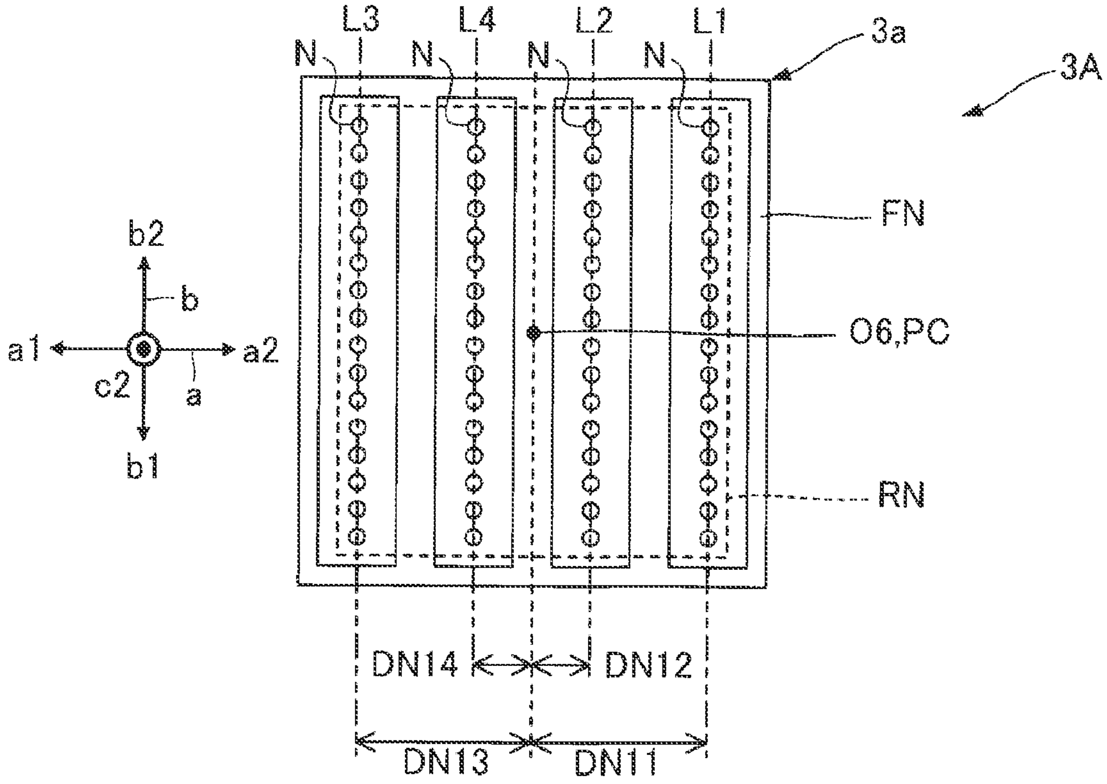
FIG. 7 is a schematic plan view for describing arrangement of a plurality of nozzle rows in a second embodiment.

FIG. 7 is a schematic plan view for describing the arrangement of the plurality of nozzle rows in the second embodiment. FIG. 7 shows a diagram in which the first nozzle row L1, the second nozzle row L2, the third nozzle row L3, and the fourth nozzle row L4 are viewed in the c1 direction as the plurality of nozzle rows. The head unit 3A of the present embodiment is the same as the head unit 3 of the first embodiment described above, except that the arrangement order of the second nozzle row L2 and the fourth nozzle row L4 is changed. Specifically, these are arranged in the order of the first nozzle row L1, the second nozzle row L2, the fourth nozzle row L4, and the third nozzle row L3 in the a1 direction. In the example illustrated in FIG. 7, these nozzle rows are arranged at equal intervals. The intervals between these nozzle rows do not have to be equal.

Even in the arrangement of the nozzle rows as described above, the distance DN12 between the second nozzle row L2 and the rotating axis O6 is less than the distance DN11 between the first nozzle row L1 and the rotating axis O6, and less than the distance DN13 between the third nozzle row L3 and the rotating axis O6, when viewed in the direction along the rotating axis O6.

Similarly, a distance DN14 between the fourth nozzle row L4 and the rotating axis O6 is less than the distance DN11 between the first nozzle row L1 and the rotating axis O6, and less than the distance DN13 between the third nozzle row L3 and the rotating axis O6.

In the example illustrated in FIG. 7, the distance DN11 is equal to the distance DN13 and the distance DN12 is equal to the distance DN14. The distance DN11 may be different from the distance DN13. Further, the distance DN12 may be different from the distance DN14.

Figure 8:
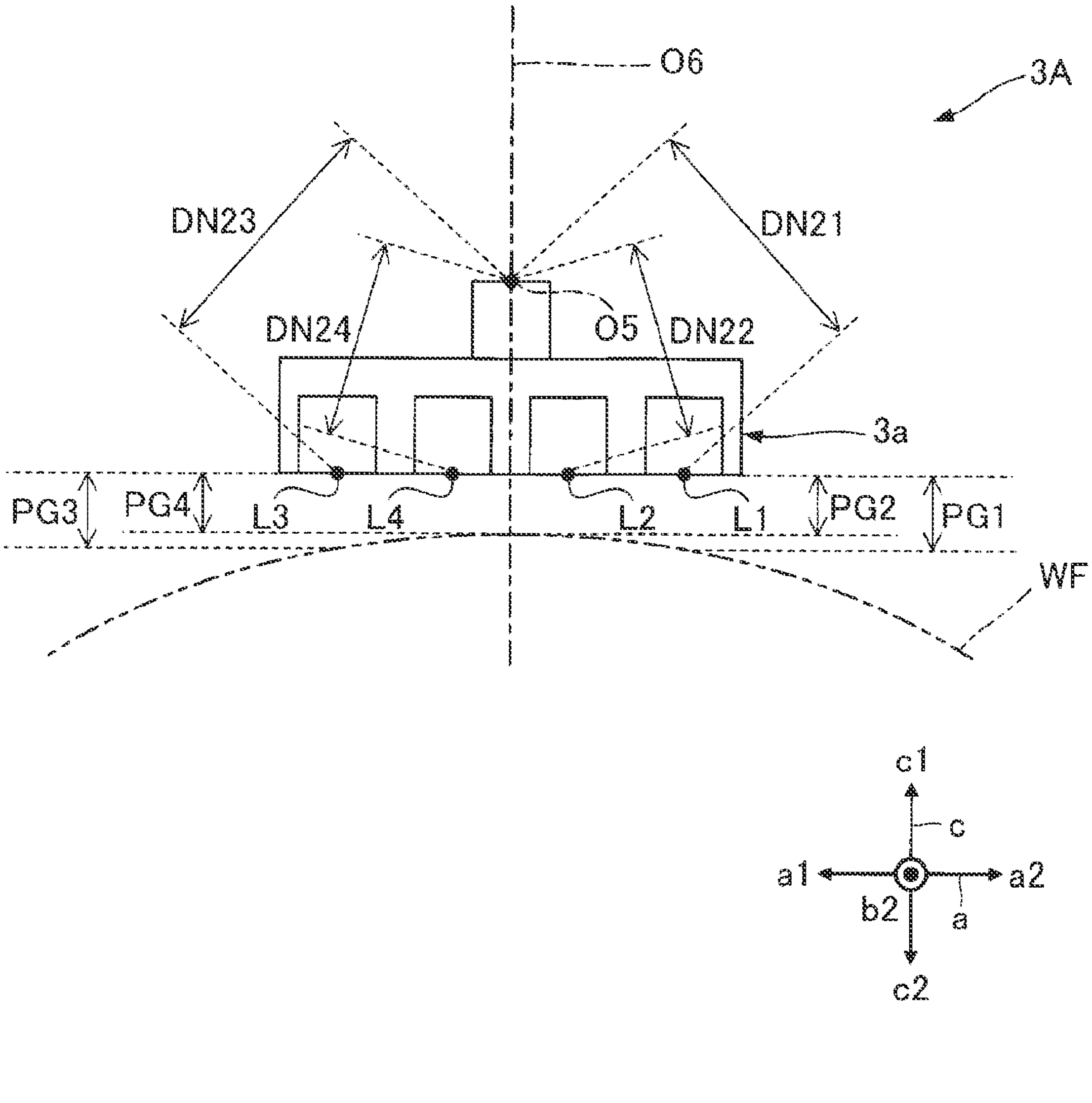
FIG. 8 is a schematic side view for describing the arrangement of the plurality of nozzle rows in the second embodiment.

FIG. 8 is a schematic side view for describing the arrangement of the plurality of nozzle rows in the second embodiment. FIG. 8 shows a diagram in which the first nozzle row L1, the second nozzle row L2, the third nozzle row L3, and the fourth nozzle row L4 are viewed in the b1 direction as the plurality of nozzle rows.

Here, as illustrated in FIG. 8, even in the present embodiment, the distance DN22 between the second nozzle row L2 and the rotating axis O5 is less than the distance DN21 between the first nozzle row L1 and the rotating axis O5, and less than the distance DN23 between the third nozzle row L3 and the rotating axis O5, when viewed in the direction along the rotating axis O5.

Similarly, a distance DN24 between the fourth nozzle row L4 and the rotating axis O5 is less than the distance DN21 between the first nozzle row L1 and the rotating axis O5, and less than the distance DN23 between the third nozzle row L3 and the rotating axis O5, when viewed in the direction along the rotating axis O5.

In the example illustrated in FIG. 8, the distance DN21 is equal to the distance DN23 and the distance DN22 is equal to the distance DN24. The distance DN21 may be different from the distance DN23. Further, the distance DN22 may be different from the distance DN24.

The print quality can also be improved by the above-described second embodiment.

3. Third Embodiment

Hereinafter, a third embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 9:
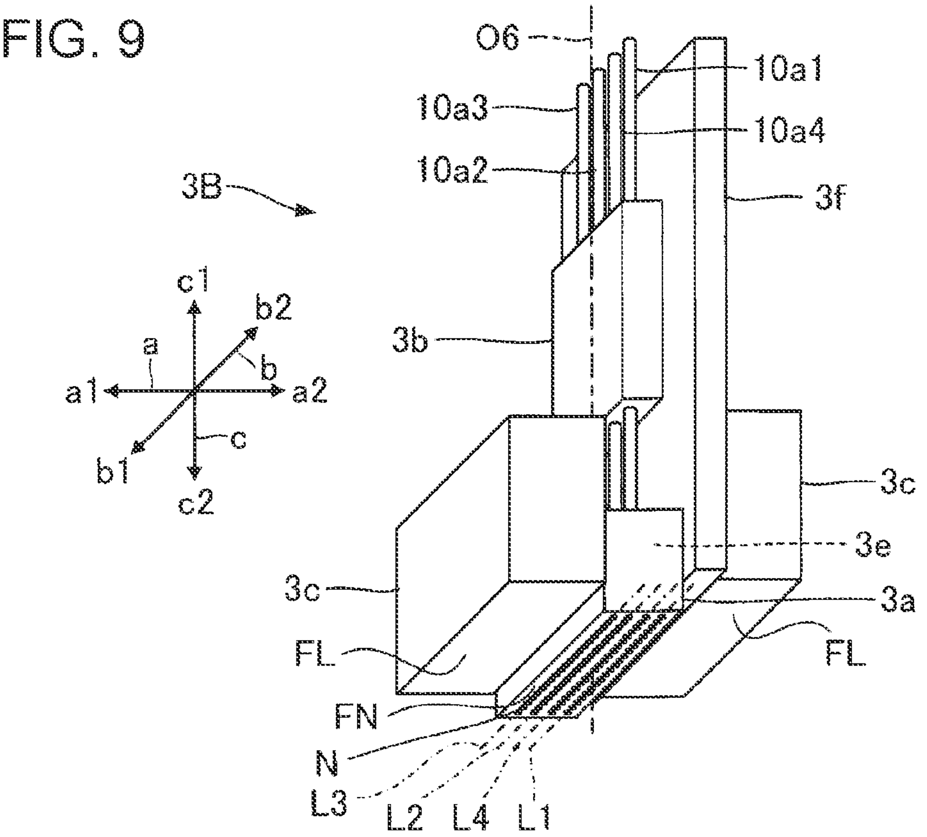
FIG. 9 is a perspective view illustrating a schematic configuration of a head unit used in a third embodiment.

FIG. 9 is a perspective view illustrating a schematic configuration of a head unit 3B used in the third embodiment. The present embodiment is the same as the first embodiment except that the head unit 3B is used instead of the head unit 3. As illustrated in FIG. 9, the head unit 3A has two energy emitting sections 3*c*. Of the two energy emitting sections 3*c*, one energy emitting section 3*c* is arranged at the position in the a1 direction with respect to the head 3*a*, and the other energy emitting section 3*c* is arranged at the position in the a2 direction with respect to the head 3*a*.

Figure 10:
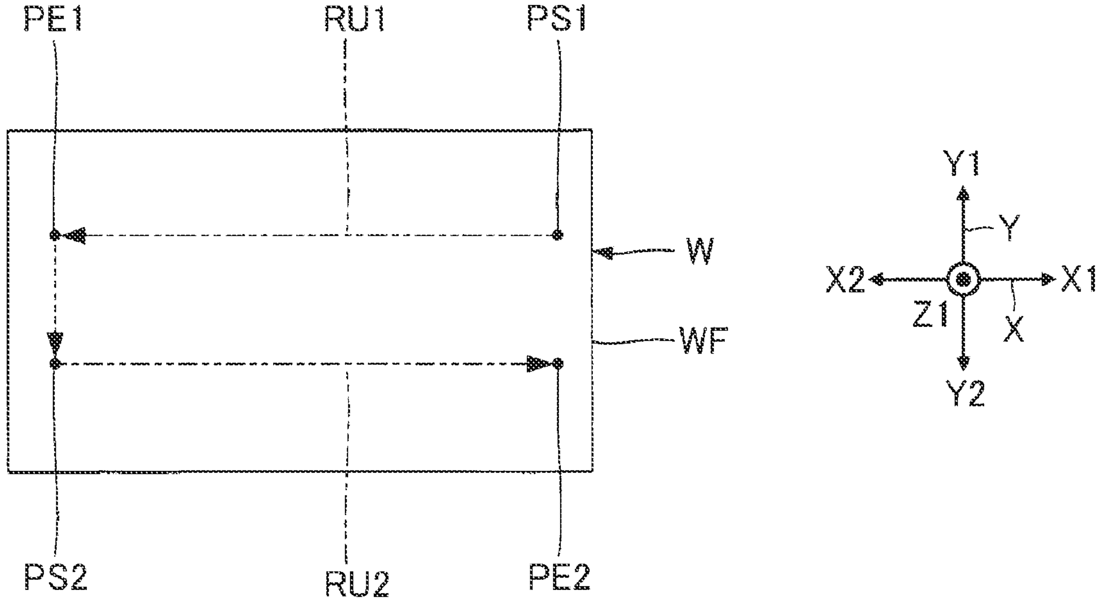
FIG. 10 is a view for describing a moving path of a head in the third embodiment.

FIG. 10 is a diagram for describing the moving paths RU1 and RU2 of the head 3*a* in the third embodiment. The moving path RU1 is a path from a position PS1 to a position PE1. The robot 2 moves the head 3*a* in a direction away from the base portion 210 along the moving path RU1. At this time, the a1 direction faces forward in the moving direction of the head 3*a*. The moving path RU2 is a path from a position PS2 to a position PE2. The robot 2 moves the head 3*a* in a direction approaching the base portion 210 along the moving path RU2. At this time, the a2 direction faces forward in the moving direction of the head 3*a*.

Here, although not illustrated, each of the position PS1 and the position PE2 is a position in the X1 direction with respect to the predetermined region RP when viewed in the Z2 direction. Although not illustrated, each of the position PE1 and the position PS2 is a position in the X2 direction with respect to the predetermined region RP when viewed in the Z2 direction.

The print quality can also be improved by the above-described third embodiment. In the present embodiment, as described above, the two energy emitting sections 3*c* are arranged via the head 3*a*. Therefore, even when the head unit 3B is not rotated by 180° around the rotating axis O6, printing can be performed in either the direction in which the head 3*a* is away from the base portion 210 and the direction in which the head 3*a* approaches the base portion 210, and energy can be applied to the ink immediately after landing on the workpiece W.

4. Modification Example

Each of the aspects in the above-described examples can be modified in various manners. Specific modifications according to each of the above-described aspects will be described below. Noted that two or more aspects selected in any manner from the following examples can be appropriately combined with each other within a range of not being inconsistent with each other.

4-1. Modification Example 1

In each of the above-described embodiments, a configuration in which the rotating axis O6 is positioned inside the region RN when viewed in the direction along the rotating axis O6 is exemplified, but the configuration is not limited to this configuration. Hereinafter, an example of the configuration in which the rotating axis O6 is positioned outside the region RN when viewed in the direction along the rotating axis O6 will be described.

Figure 11:
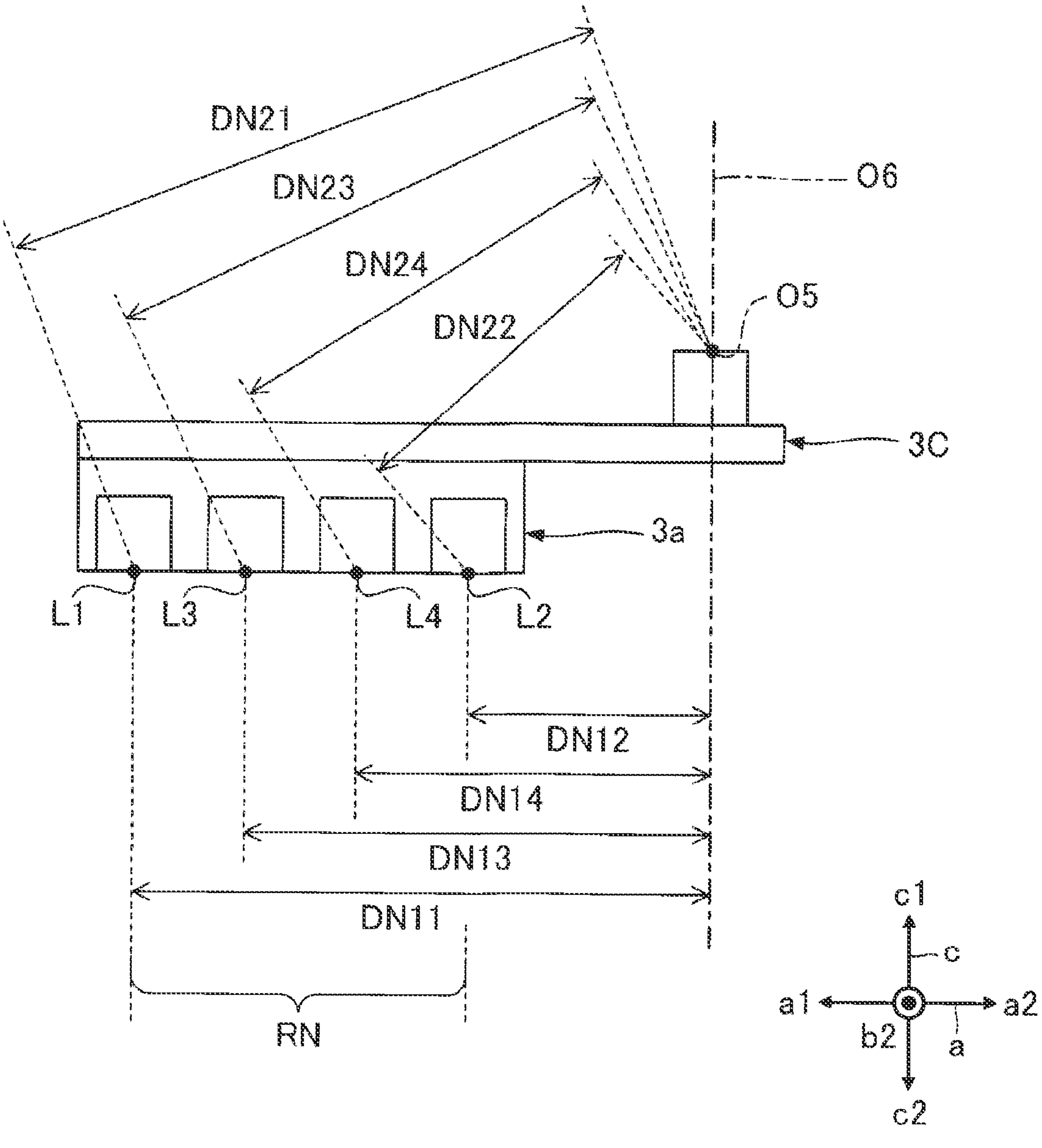
FIG. 11 is a schematic side view for describing arrangement of a plurality of nozzle rows in Modification Example 1.

FIG. 11 is a schematic side view for describing arrangement of a plurality of nozzle rows in Modification Example 1. FIG. 11 shows a diagram in which the first nozzle row L1, the second nozzle row L2, the third nozzle row L3, and the fourth nozzle row L4 are viewed in the b1 direction as the plurality of nozzle rows. In the head unit 3C of the present modification example, the rotating axis O6 is positioned outside the region RN when viewed in the direction along the rotating axis O6. In the example illustrated in FIG. 11, the region RN is arranged at the position in the a1 direction with respect to the rotating axis O6.

Here, these are arranged in the order of the second nozzle row L2, the fourth nozzle row L4, the third nozzle row L3, and the first nozzle row L1 in the a1 direction. In the example illustrated in FIG. 11, these nozzle rows are arranged at equal intervals. The intervals between these nozzle rows do not have to be equal.

In the arrangement of the nozzle rows as described above, the distances from the rotating axis O6 when viewed in the direction along the rotating axis O6 are, from the short distance to the long distance, in the order of the second nozzle row L2, the fourth nozzle row L4, the third nozzle row L3, and the first nozzle row L1. That is, from the short distance to the long distance, the distances are in the order of the distance DN12, the distance DN14, the distance DN13, and the distance DN11.

Further, the distances from the rotating axis O5 when viewed in the direction along the rotating axis O5 are, from the short distance to the long distance, in the order of the second nozzle row L2, the fourth nozzle row L4, the third nozzle row L3, and the first nozzle row L1. That is, from the short distance to the long distance, the distances are in the order of the distance DN22, the distance DN24, the distance DN23, and the distance DN21.

Even in the above modification example 1, since the distance DN12 is less than the distance DN11, the print quality can be improved. Further, since the distance DN22 is less than the distance DN21, the print quality can be improved in this respect as well.

4-2. Modification Example 2

In the above-described embodiment, a configuration is exemplified in which, among the plurality of nozzle rows, the nozzle row closest to the rotating axis O5 or the rotating axis O6 is the second nozzle row L2, and the farthest nozzle row is the first nozzle row L1. However, the configuration is not limited thereto. The plurality of nozzle rows may be arranged such that the second nozzle row L2 is arranged at a position closer to the rotating axis O5 or the rotating axis O6 than the first nozzle row L1.

4-3. Modification Example 3

In the above-described embodiment, a configuration in which the ejection surface FN is orthogonal to the rotating axis O6 is exemplified, but the configuration is not limited to this configuration, and the magnitude relationship of the distances between the rotating axis O6 and each nozzle row as described above may be satisfied. For example, as long as such a magnitude relationship is satisfied, the ejection surface FN may be parallel to the rotating axis O6, or the ejection surface FN may be tilted with respect to the rotating axis O5 or the rotating axis O6.

4-4. Modification Example 4

In the above-described aspect, a configuration in which printing is performed using four types of ink is exemplified, but the configuration may be any configuration using the first ink and the second ink, the configuration is not limited to the configuration, and the present disclosure can also be applied to a configuration in which printing is performed using two types, three types, or five or more types of ink. Further, the first ink may be any ink having a higher brightness than the second ink, and is not limited to the yellow ink. Further, the second ink may be any ink having a lower brightness than the first ink, and is not limited to the black ink.

4-5. Modification Example 5

In the above-described aspect, the configuration using the energy emitting section 3*c* is exemplified, but the configuration is not limited thereto, and the energy emitting section 3*c* may be omitted. In this case, for example, another means for emitting light that cures or solidifies the ink on the workpiece may be arranged outside the robot 2.

4-6. Modification Example 6

In the above-described aspect, a configuration using a 6-axis vertical multi-axis robot as a moving mechanism is exemplified, but the configuration is not limited to this configuration. The moving mechanism may be, for example, a vertical multi-axis robot having 5 or less axes or 7 or more axes, or a horizontal multi-axis robot. Further, the arm portion of the robot may have a telescopic mechanism, a linear motion mechanism, or the like in addition to the rotating section configured by the rotating mechanism. However, from the viewpoint of the balance between the print quality in the printing operation and the degree of freedom of the robot operation in the non-printing operation, the robot is preferably a multi-axis robot having 6 or more axes.

4-7. Modification Example 7

In the above-described aspect, a configuration using screwing or the like as a method of fixing the head to the robot is exemplified, but the configuration is not limited to this configuration. For example, the head may be fixed to the robot by gripping the head by a gripping mechanism such as a hand mounted as an end effector of the robot.

4-8. Modification Example 8

In the above-described aspect, a configuration which the ejection surface FN and the rotating axis O6 intersect perpendicularly is exemplified, but the configuration is not limited to this configuration. For example, the angle between the ejection surface FN and the rotating axis O6 may be smaller than 90°. In this case, the distance between the rotating axis O6, which is an example of the "first rotating axis", and the nozzle row is defined as the distance between the intersection point of the ejection surface FN and the rotating axis O6 and the nozzle row.

What is claimed is:

1. A printing apparatus comprising:

a head including a first nozzle row in which a plurality of nozzles for ejecting a first ink are arranged and a second nozzle row in which a plurality of nozzles for ejecting a second ink are arranged; and a robot which includes an arm portion having a distal end, a proximal end, and a plurality of joints, and a base portion coupled to the proximal end, supports the head by the distal end, and changes a position and a posture of the head with respect to a workpiece, wherein a brightness of the second ink is lower than a brightness of the first ink, the plurality of joints have a first joint which is a joint closest to the distal end among the plurality of joints, the first joint is a rotating mechanism around a first rotating axis, and a distance between the second nozzle row and the first rotating axis is less than a distance between the first nozzle row and the first rotating axis when viewed in a direction along the first rotating axis.

2. The printing apparatus according to claim 1, wherein the head further includes a third nozzle row in which a plurality of nozzles for ejecting a third ink are arranged, a brightness of the third ink is lower than the brightness of the first ink and higher than the brightness of the second ink, the distance between the second nozzle row and the first rotating axis is less than a distance between the third nozzle row and the first rotating axis when viewed in the direction along the first rotating axis, and the second nozzle row is positioned between the first nozzle row and the third nozzle row when viewed in the direction along the first rotating axis.

3. The printing apparatus according to claim 2, wherein the head further includes a fourth nozzle row in which a plurality of nozzles for ejecting a fourth ink are arranged, a brightness of the fourth ink is higher than the brightness of the second ink and lower than the brightness of the third ink, a distance between the fourth nozzle row and the first rotating axis is less than the distance between the first nozzle row and the first rotating axis, and is less than the distance between the third nozzle row and the first rotating axis when viewed in the direction along the first rotating axis, and the fourth nozzle row is positioned between the first nozzle row and the third nozzle row when viewed in the direction along the first rotating axis.

4. The printing apparatus according to claim 1, wherein the plurality of joints have a second joint which is a joint closest to the distal end after the first joint among the plurality of joints, the second joint is a rotating mechanism around a second rotating axis that intersects the first rotating axis, and a distance between the second nozzle row and the second rotating axis is less than a distance between the first nozzle row and the second rotating axis when viewed in a direction along the second rotating axis.

5. The printing apparatus according to claim 1, further comprising:

a flexible first supply pipe for supplying the first ink to the first nozzle row; and a flexible second supply pipe for supplying the second ink to the second nozzle row, wherein a part of each of the first supply pipe and the second supply pipe is held by the arm portion, and a distance between a downstream end of the second supply pipe and the first rotating axis is less than a distance between a downstream end of the first supply pipe and the first rotating axis.

6. The printing apparatus according to claim 1, further comprising:

an energy emitting section including an emitting surface supported by the distal end and emitting energy for curing each of the first ink and the second ink, wherein the head includes a plurality of nozzle rows for ejecting an ink, the plurality of nozzle rows include the first nozzle row and the second nozzle row, and a distance between each of the plurality of nozzle rows and the first rotating axis is less than a distance between the emitting surface and the first rotating axis when viewed in the direction along the first rotating axis.

7. The printing apparatus according to claim 1, wherein the head includes a plurality of nozzle rows for ejecting an ink, and the first rotating axis is positioned inside a region defined by a set of the plurality of nozzle rows when viewed in the direction along the first rotating axis.

8. The printing apparatus according to claim 1, wherein the head has an ejection surface provided with four nozzle rows for ejecting an ink, the four nozzle rows include the first nozzle row and the second nozzle row, and the second nozzle row is a nozzle row closest to a center of the ejection surface among the four nozzle rows.

9. The printing apparatus according to claim 1, wherein the second ink is an ink having a lowest brightness among the inks ejected from the head.

10. The printing apparatus according to claim 1, wherein the second ink is black ink.

11. The printing apparatus according to claim 1, wherein the first ink is an ink having a highest brightness among the inks ejected from the head.

12. The printing apparatus according to claim 1, wherein the first ink is yellow ink or white ink.

13. The printing apparatus according to claim 1, wherein motors for driving the joint are provided in each of the plurality of joints, and a rated output of the motor that drives the first joint is less than a rated output of the motor that drives each of the plurality of joints except the first joint among the plurality of joints.

* * * * *